United States Patent
Adams et al.

(10) Patent No.: US 10,075,453 B2
(45) Date of Patent: Sep. 11, 2018

(54) DETECTING SUSPICIOUS FILES RESIDENT ON A NETWORK

(71) Applicant: Juniper Networks, Inc., Sunnyvale, CA (US)

(72) Inventors: Kyle Adams, Brisbane, CA (US); Jacob Asher Langton, Oakland, CA (US); Daniel J. Quinlan, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 108 days.

(21) Appl. No.: 14/674,113

(22) Filed: Mar. 31, 2015

(65) Prior Publication Data

US 2016/0294849 A1 Oct. 6, 2016

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06F 21/56 | (2013.01) |
| G06F 21/57 | (2013.01) |

(52) U.S. Cl.
CPC .......... *H04L 63/1408* (2013.01); *G06F 21/56* (2013.01); *G06F 21/564* (2013.01); *G06F 21/577* (2013.01); *H04L 63/0876* (2013.01)

(58) Field of Classification Search
CPC ........................................ G06F 21/50–21/568
USPC ....................................................... 726/22–25
See application file for complete search history.

(56) References Cited

U.S. PATENT DOCUMENTS

| | | | |
|---|---|---|---|
| 8,370,942 B1 | 2/2013 | Peterson et al. | |
| 8,413,235 B1 * | 4/2013 | Chen | G06F 21/552 713/188 |
| 8,607,335 B1 * | 12/2013 | Liu | G06F 21/567 713/188 |
| 8,739,287 B1 | 5/2014 | Polyakov et al. | |
| 8,839,434 B2 * | 9/2014 | McDougal | G06F 21/567 726/1 |
| 9,094,288 B1 * | 7/2015 | Nucci | H04L 43/026 |
| 2004/0181788 A1 * | 9/2004 | Kester | G06F 21/50 717/168 |

(Continued)

OTHER PUBLICATIONS

Extended European Search Report corresponding to EP Application No. 15179103.5 dated Aug. 31, 2016, 7 pages.

*Primary Examiner* — Morshed Mehedi
*Assistant Examiner* — Vadim Savenkov
(74) *Attorney, Agent, or Firm* — Harrity & Harrity, LLP

(57) ABSTRACT

A device may determine a first set of hash values corresponding to a first set of files stored by a plurality of client devices. The device may analyze information associated with the first set of hash values to determine a second set of hash values corresponding to a second set of files to be analyzed. The second set of hash values may be different from the first set of hash values. The device may prioritize the second set of hash values to form a prioritized set of hash values corresponding to a prioritized set of files, of the second set of files, to be analyzed. The device may request the prioritized set of files from one or more client devices of the plurality of client devices. The device may receive the prioritized set of files, and may cause the prioritized set of files to be analyzed.

20 Claims, 9 Drawing Sheets

(56) References Cited

U.S. PATENT DOCUMENTS

| | | | |
|---|---|---|---|
| 2006/0037079 A1* | 2/2006 | Midgley | G06F 21/56 726/24 |
| 2007/0038677 A1* | 2/2007 | Reasor | G06F 21/565 |
| 2007/0079377 A1* | 4/2007 | Pagan | G06F 21/562 726/24 |
| 2008/0209557 A1* | 8/2008 | Herley | G06F 21/565 726/23 |
| 2009/0083852 A1* | 3/2009 | Kuo | G06F 21/564 726/22 |
| 2010/0077481 A1* | 3/2010 | Polyakov | G06F 21/568 726/24 |
| 2010/0169972 A1* | 7/2010 | Kuo | H04L 63/145 726/23 |
| 2010/0192222 A1* | 7/2010 | Stokes | G06F 21/563 726/22 |
| 2011/0145920 A1* | 6/2011 | Mahaffey | G06F 21/564 726/22 |
| 2012/0017275 A1* | 1/2012 | Harmonen | H04L 63/1425 726/24 |
| 2013/0111547 A1* | 5/2013 | Kraemer | G06F 21/552 726/1 |
| 2014/0157408 A1* | 6/2014 | Mei | G06F 21/55 726/22 |
| 2015/0113653 A1* | 4/2015 | Song | H04L 63/145 726/24 |
| 2015/0264060 A1* | 9/2015 | Li | H04L 63/0218 726/24 |

\* cited by examiner

US 10,075,453 B2

DETECTING SUSPICIOUS FILES RESIDENT ON A NETWORK

BACKGROUND

A hash function is any function that can be used to map digital data of arbitrary size to digital data of fixed size. The values returned by a hash function may be referred to as hash values. The hash function may be performed on a string of text, an electronic file, contents of a hard drive, or other electronic data to generate a hash value that corresponds to the string of text, electronic file, hard drive contents, or other electronic data.

SUMMARY

According to some possible implementations, a device may determine a first set of hash values corresponding to a first set of files stored by a plurality of client devices. The device may analyze information associated with the first set of hash values to determine a second set of hash values corresponding to a second set of files to be analyzed. The second set of hash values may be different from the first set of hash values. The device may prioritize the second set of hash values to form a prioritized set of hash values corresponding to a prioritized set of files, of the second set of files, to be analyzed. The device may request the prioritized set of files from one or more client devices of the plurality of client devices. The device may receive the prioritized set of files, and may cause the prioritized set of files to be analyzed.

According to some possible implementations, a computer-readable medium may store one or more instructions that, when executed by one or more processors, cause the one or more processors to determine a first set of hash values corresponding to a first set of files stored by at least one client device of a plurality of client devices. The one or more instructions may cause the one or more processors to analyze one or more hash value parameters associated with the first set of hash values to determine a second set of hash values corresponding to a second set of files to be analyzed. The one or more instructions may cause the one or more processors to prioritize the second set of hash values to form a prioritized set of hash values corresponding to a prioritized set of files, of the second set of files, to be analyzed. The one or more instructions may cause the one or more processors to request the prioritized set of files from the at least one client device, receive the prioritized set of files, and identify one or more suspicious files, included in the prioritized set of files, based on an analysis of the prioritized set of files.

According to some possible implementations, a method may include determining, by a device, a first set of hash values corresponding to a first set of files stored by at least one client device of a plurality of client devices. The method may include analyzing, by the device, one or more hash value parameters associated with the first set of hash values to determine a second set of hash values corresponding to a subset of the first set of files to be analyzed. The second set of hash values may be a subset of the first set of hash values. The method may include prioritizing, by the device, the second set of hash values to form a prioritized set of hash values corresponding to a prioritized set of files, of the subset of the first set of files, to be analyzed. The method may include requesting, by the device, the prioritized set of files from the at least one client device. The method may include receiving, by the device, the prioritized set of files. The method may include identifying, by the device, one or more suspicious files, included in the prioritized set of files, based on an analysis of the prioritized set of files.

DETAILED DESCRIPTION

The following detailed description of example implementations refers to the accompanying drawings. The same reference numbers in different drawings may identify the same or similar elements.

Certain files resident on a network, such as a private network, may violate a policy associated with the network, may be harmful to the network (e.g., may be malware), or may otherwise be of interest to a network administrator. Such suspicious files, which may be stored by client devices connected to the network, may be difficult to identify without prior information about the files, such as which files are known to be harmful, which files are known to violate a policy, or the like. Implementations described herein may assist with detecting and identifying suspicious files resident on a network with little or no prior information that indicates whether a file is suspicious.

Figure 1:
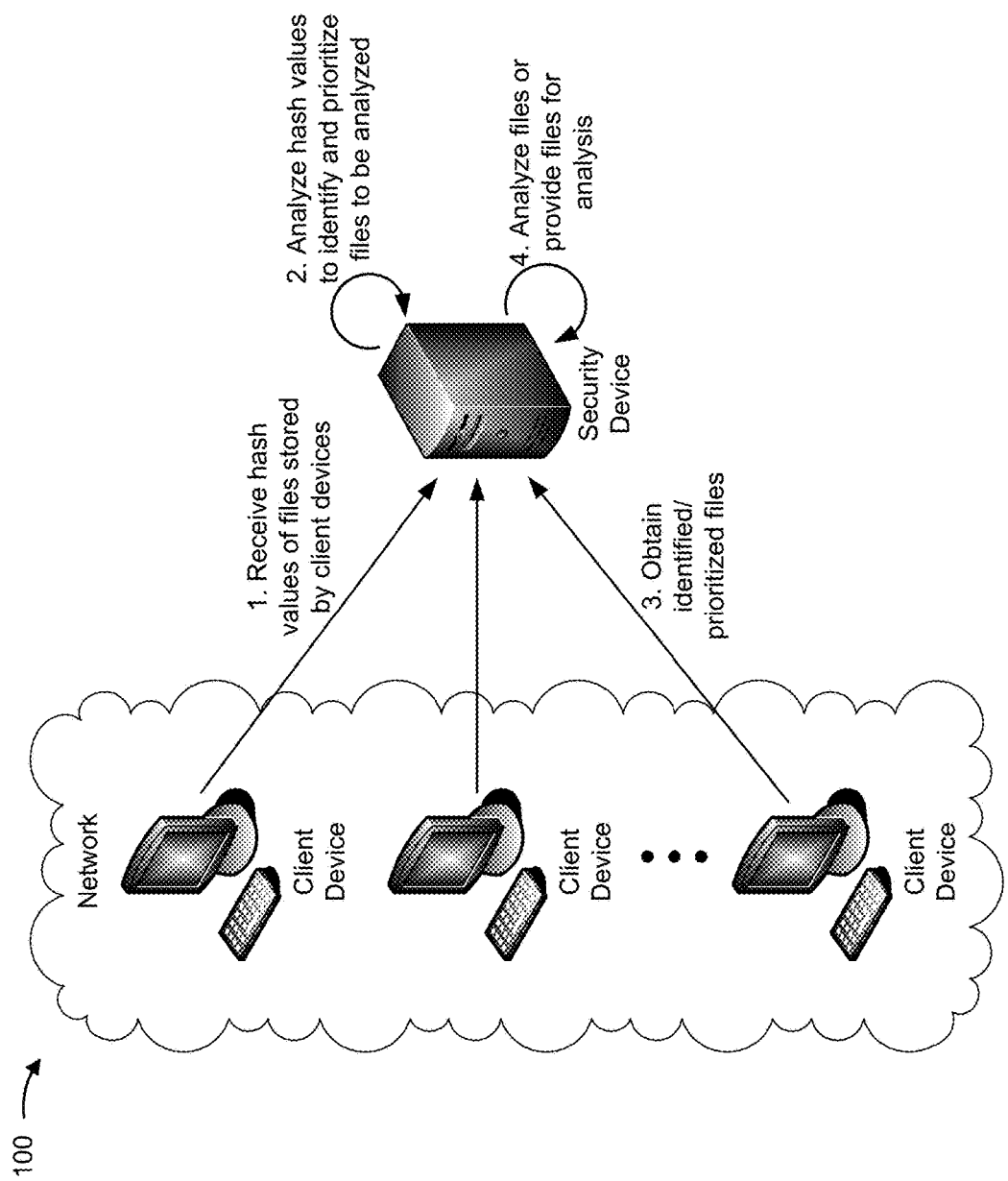
FIG. 1 is a diagram of an overview of an example implementation described herein.

FIG. 1 is a diagram of an overview of an example implementation 100 described herein. As shown in FIG. 1, a network (e.g., a private network, a local area network, or the like) may include multiple client devices that store files (e.g., suspicious files, unsuspicious files, etc.). As further shown, a security device (e.g., a firewall, a switch, a server, etc.) may communicate with the client devices to provide a security service for the network. For example, the security device may monitor the client devices to identify suspicious files (e.g., files of interest to be analyzed).

For example, and as shown, the security device may request and receive hash values of files stored by the client devices. The security device may receive hash values of files, rather than the actual files, to conserve network resources. Additionally, or alternatively, the security device may receive metadata associated with the files. The security device may analyze the hash values and/or the metadata to identify and/or prioritize files to be analyzed. For example, the security device may identify and/or prioritize a file to be analyzed based on a quantity of client devices that store a hash value of the file, based on a blacklist that identifies hash values of suspicious files, based on a whitelist that identifies hash values of unsuspicious files, or the like.

As further shown in FIG. 1, the security device may obtain the identified files from the client devices (e.g., in an order based on a priority of the identified files). After receiving a file, the security device may analyze the file and/or may provide the file for analysis. For example, the security device may determine whether the file is malicious (e.g., malware, ransomware, a virus, a trojan, or the like), whether the file violates a policy associated with the network, or the like. In this way, the security device may identify suspicious files resident on a network with little or no prior information that indicates whether a file is suspicious.

Figure 2:
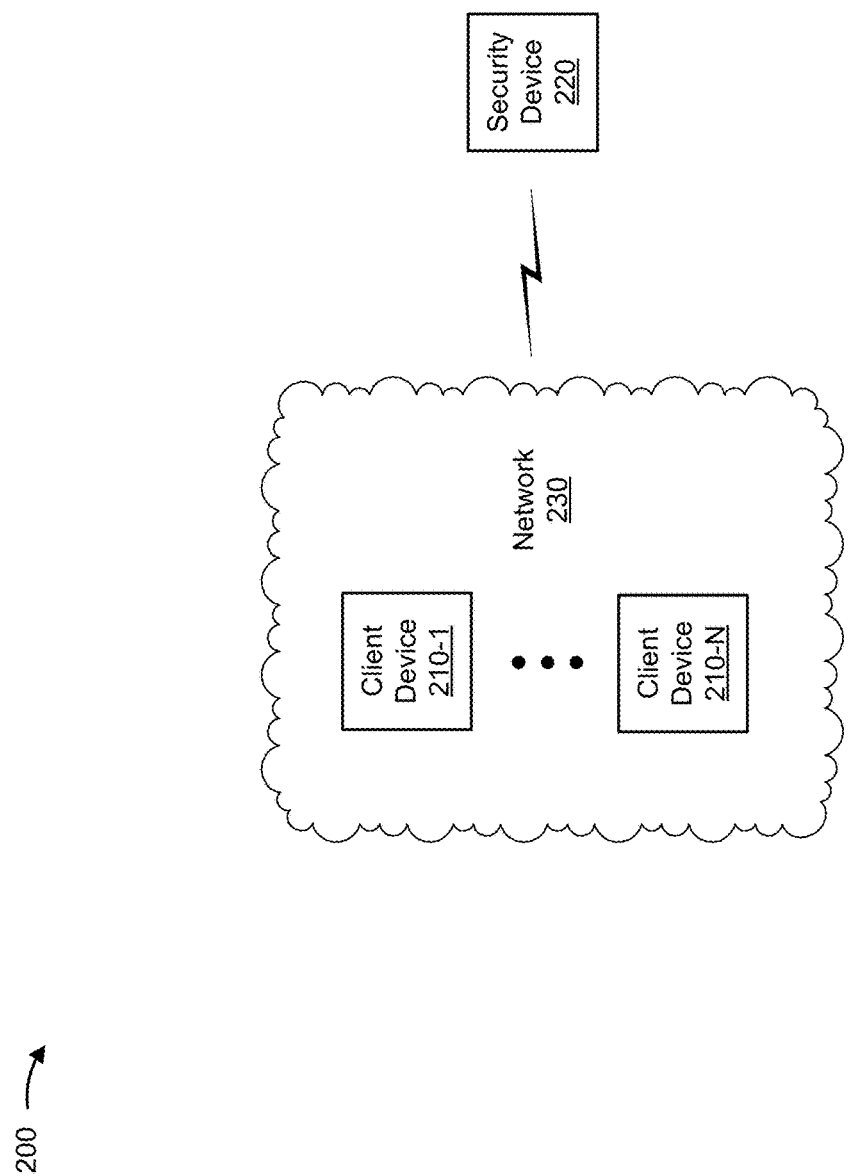
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, and a network 230. Devices of environment 200 may interconnect via wired connections, wireless connections, or a combination of wired and wireless connections.

Client device 210 may include one or more devices capable of receiving, generating, storing, processing, and/or providing a file. For example, client device 210 may include a desktop computer, a laptop computer, a tablet computer, a mobile phone (e.g., a smart phone, a radiotelephone, etc.), a server, or a similar type of device. Client device 210 may reside on network 230. In other words, client devices 210 may be associated with one another (e.g., due to being resident on the same network). As described in more detail herein, client device 210 may provide hash values of files, and/or the files themselves, to security device 220 for analysis.

Security device 220 may include one or more devices capable of communicating with client device 210 to receive hash values of files, and/or the files themselves, for analysis. For example, security device 220 may include a gateway, a firewall, a router, a bridge, a hub, a switch, a load balancer, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to network 230 that includes the group of client devices 210. Additionally, or alternatively, communications from client devices 210 may be encoded such that the communications are routed to security device 220 before being routed elsewhere.

Network 230 may include one or more wired and/or wireless networks. For example, network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, network 230 may be a private network associated with client devices 210.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
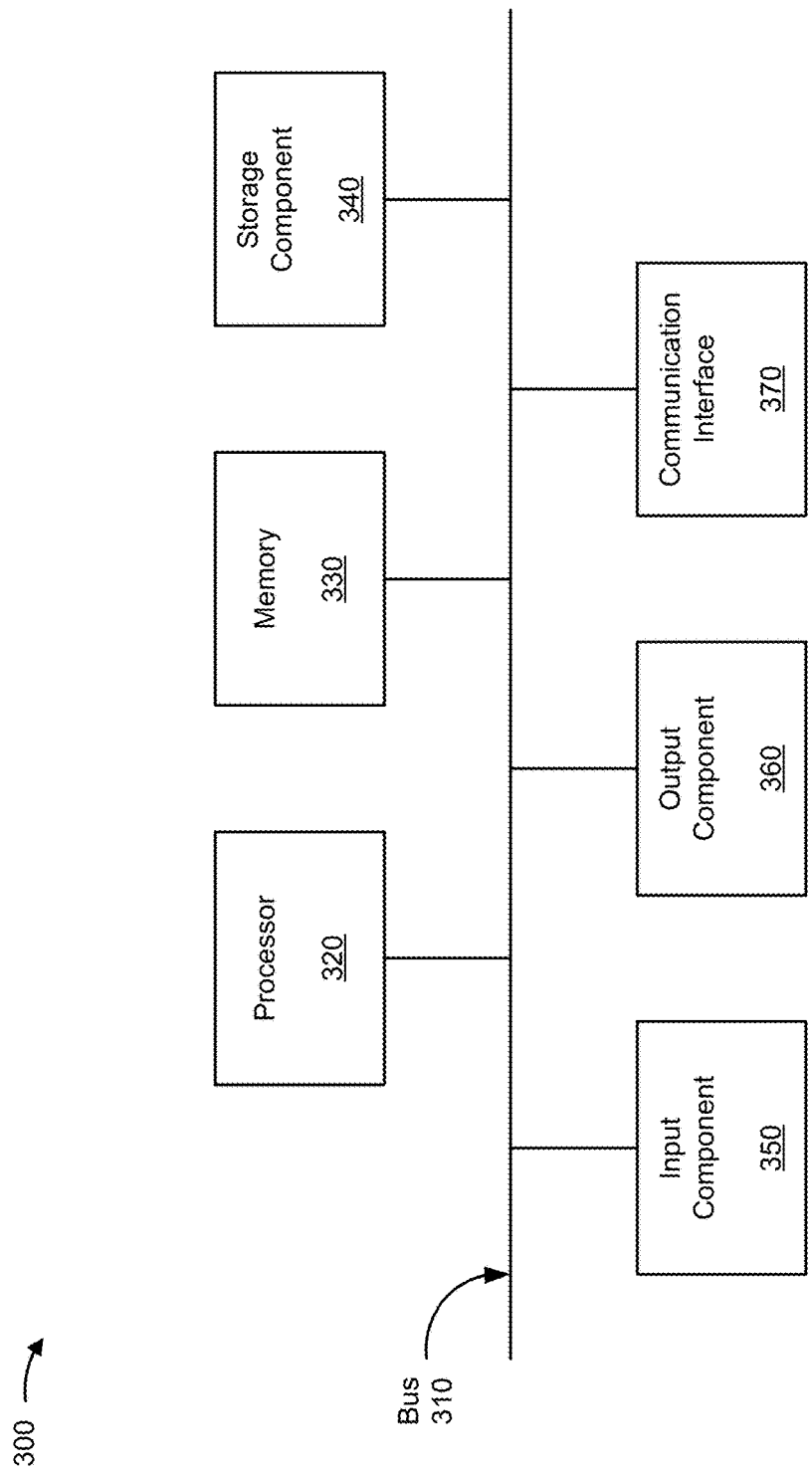
FIG. 3 is a diagram of example components of one or more devices of FIG. 2.

FIG. 3 is a diagram of example components of a device 300. Device 300 may correspond to client device 210 and/or security device 220. In some implementations, client device 210 and/or security device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
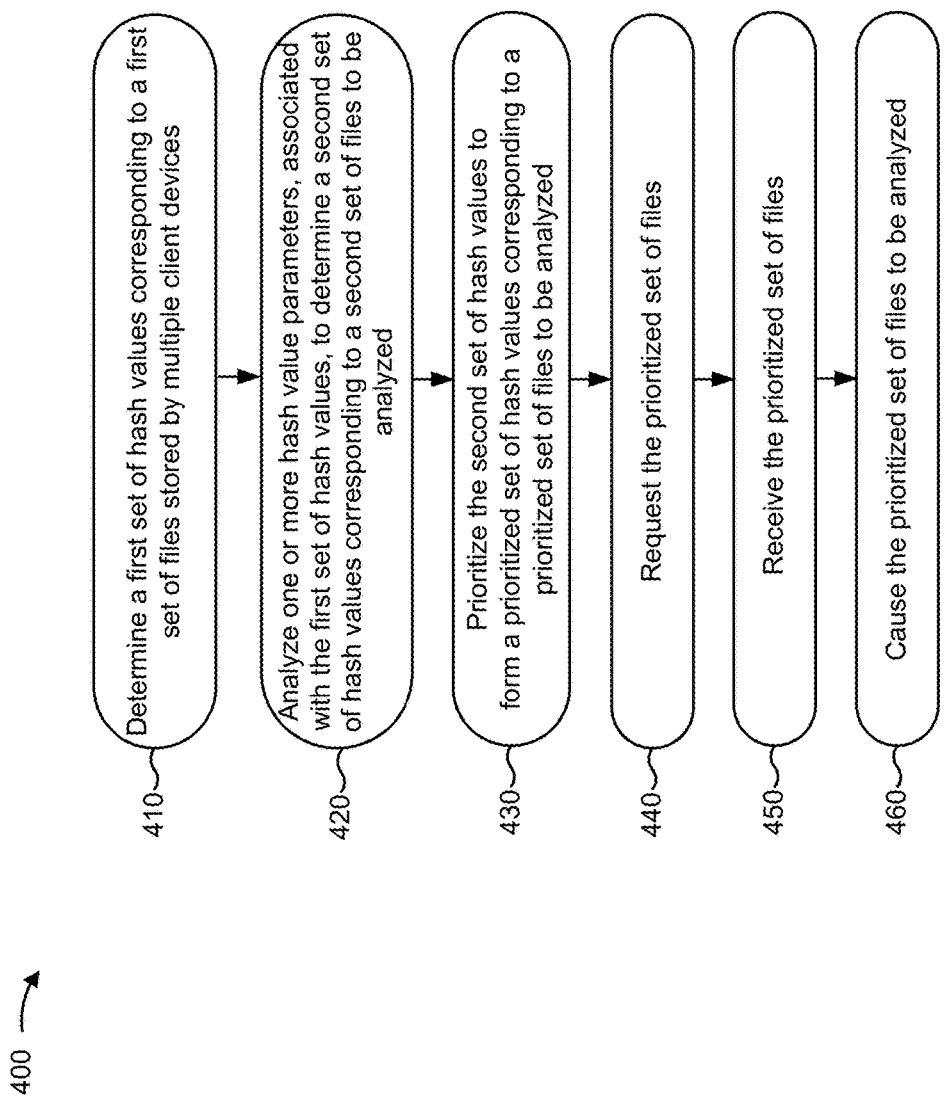
FIG. 4 is a flow chart of an example process for detecting suspicious files resident on a network.

FIG. 4 is a flow chart of an example process 400 for detecting suspicious files resident on a network. In some implementations, one or more process blocks of FIG. 4 may be performed by security device 220. In some implementations, one or more process blocks of FIG. 4 may be performed by another device or a set of devices separate from or including security device 220, such as client device 210.

As shown in FIG. 4, process 400 may include determining a first set of hash values corresponding to a first set of files stored by multiple client devices (block 410). For example, security device 220 may determine hash values of files stored by client devices 210. In some implementations, security device 220 may periodically determine the hash values, such as when performing a periodic security scan of client devices 210 associated with network 230. Additionally, or alternatively, security device 220 may determine the hash values based on detecting an event (e.g., a detected security breach, input received from a network administrator, etc.). Security device 220 may determine the hash values of the files so that suspicious files (e.g., files that may be malware, files that may be harmful to client device 210 and/or network 230, files that violate a policy associated with network 230, etc.) may be analyzed.

A hash value may correspond to a file stored by client device 210. For example, client device 210 may store a file (e.g., in memory), and a hash value of the file may be generated by applying a hash function to the file. In some implementations, security device 220 may determine a hash value by receiving the hash value from client device 210. In this case, security device 220 may send a request to client device 210 to cause client device 210 to generate hash values of files stored by client device 210. In some implementations, the request may include the hash function and/or an instruction to execute the hash function (e.g., a script). Based on receiving the request, client device 210 may apply the hash function to files stored by client device 210 to generate hash values of the files.

Additionally, or alternatively, security device 220 may determine a hash value by applying a hash function to a file to generate the hash value. In some implementations, security device 220 may include a remote management interface that permits security device 220 to execute commands using files stored by client device 210. For example, security device 220 may execute a remote management application to permit interfacing with client device 210, such as a Windows management interface, a secure shell (e.g., with administrator credentials), or the like. In this case, security device 220 may access files stored by client device 210, and may execute the hash function (e.g., using a script) to generate hash values for the files.

In some implementations, security device 220 may determine hash values corresponding to all files stored by client device(s) 210. In some implementations, particular files may be included in a whitelist (e.g., may be known to be safe, or unsuspicious, files). In this case, security device 220 may determine hash values corresponding to files, stored by client device(s) 210, that are not included in the whitelist.

When security device 220 generates the hash values, security device 220 may access the files stored by client device(s) 210, may compare information associated with a file (e.g., a file name, a file location, etc.) to information stored in the whitelist, and may generate a hash value of the file if the file is not identified in the whitelist. When client device 210 generates and provides the hash values to security device 220, security device 220 may provide the whitelist to client device 210 (or may identify a location in memory of client device 210 where the whitelist is stored). In this case, client device 210 may compare information associated with a file to information stored in the whitelist, may generate a hash value of the file if the file is not identified in the whitelist, and may provide the generated hash value to security device 220.

Additionally, or alternatively, security device 220 may determine metadata associated with the set of files. The metadata may include, for example, a name of a file, a type of a file, a format of a file, a size of a file, a timestamp associated with a file (e.g., when the file was received, stored, downloaded, updated, edited, etc.), a certificate associated with the file (e.g., whether the file is associated with a certificate, whether the file is associated with a certificate from a trusted authority, etc.), or the like. Security device 220 may use the metadata to determine a second set of hash values and/or to prioritize the second set of hash values, as described in more detail below.

As further shown in FIG. 4, process 400 may include analyzing one or more hash value parameters, associated with the first set of hash values, to determine a second set of hash values corresponding to a second set of files to be analyzed (block 420). For example, security device 220 may determine (e.g., may receive and/or generate) a first set of hash values, as described in connection with block 410, and may analyze the first set of hash values to form a second set of hash values (e.g., which may or may not be different from the first set of hash values). In some implementations, the second set of hash values may be a subset of the first set of hash values. In some implementations, the second set of hash values may include the entire first set of hash values. The second set of hash values may be associated with files that are to undergo analysis (e.g., suspicious files).

As described in more detail below, a hash value parameter may indicate whether a hash value is associated with an unsuspicious file, whether a hash value is associated with a suspicious file, a quantity of client devices 210 associated with the hash value (e.g., a quantity of client devices 210 that store a file used to generate the hash value), a score associated with a hash value, or the like.

In some implementations, security device 220 may identify a hash value, included in the first set of hash values, that is associated with an unsuspicious file. For example, the hash value (or other information for a file associated with the hash value) may be stored on a whitelist, may be associated with an indicator that indicates that the hash value (or the file) is unsuspicious, or the like. Security device 220 may determine that the hash value and/or the file is unsuspicious, and may remove the hash value from the first set of hash values to form the second set of hash values. In this way, unsuspicious files need not be further analyzed, thus saving processing resources.

Additionally, or alternatively, security device 220 may identify a hash value, included in the first set of hash values, that is associated with a suspicious file. For example, the hash value (or other information for a file associated with the hash value) may be stored on a blacklist, may be associated with an indicator that indicates that the hash value (or the file) is suspicious, or the like. Security device 220 may determine that the hash value and/or the file is suspicious, and may preserve the hash value in the first set of hash values when forming the second set of hash values. In this way, suspicious files may be further analyzed.

In some implementations, security device 220 may identify a quantity of client devices 210 associated with a hash value included in the first set of hash values. Security device 220 may determine whether to include the hash value in the second set of hash values based on the quantity of client devices 210 associated with the hash value. For example, security device 220 may determine whether the quantity satisfies a threshold value (e.g., is greater than the threshold value, is less than the threshold value, is equal to the threshold value, or the like), and may include the hash value in the second set of hash values based on determining whether the quantity satisfies the threshold value. The threshold value may be, for example, an absolute quantity (e.g., five, ten, fifty, one hundred, etc.), a relative quantity based on the total quantity of client devices 210 included in network 230 (e.g., half of the client devices 210, one third of the client devices 210, etc.), a relative quantity based on the total quantity of client devices 210 being analyzed (e.g., half of the client devices 210 from which hash values are determined), or the like. In this way, files may be analyzed based on a relationship between the files and client devices 210 in network 230.

As an example, if a hash value is associated with all client devices 210 in network 230, the hash value may not be included in the second set of hash value because the hash value is assumed to be safe if all client devices 210 store a file associated with the hash value. As another example, if a hash value is associated with all client devices 210 in network 230, the hash value may be included in the second set of hash values to ensure that a file, stored by all client devices 210, is analyzed. In some implementations, security device 210 may receive information (e.g., based on network administrator input) that indicates whether to include a hash value in the second set of hash values based on a hash value parameter, a threshold being satisfied, or the like.

In some implementations, security device 220 may determine a client device identifier of a client device 210 that stores a file used to generate the hash value. The client device identifier may include, for example, a serial number of client device 210, a user name of a user associated with client device 210, a network address of client device 210 (e.g., an internet protocol (IP) address, a media access control (MAC) address, etc.), or the like. Security device 220 may use the client device identifier to determine whether to include the hash value in the second set of hash values. For example, security device 220 may determine (e.g., based on information stored by security device 220) whether the client device identifier is associated with a client device 210 that has stored suspicious files in the past and/or that currently stores a suspicious file, whether the client device identifier is associated with a suspicious user, or the like. If so, security device 220 may include the hash value in the second set of hash values.

In some implementations, security device 220 may calculate a score for a hash value using a combination of hash value parameters (e.g., whether a hash value is associated with a whitelist, whether a hash value is associated with a blacklist, a quantity of client devices 210 associated with a hash value, whether the quantity satisfies a threshold value, a client device identifier associated with a hash value, etc.). Additionally, or alternatively, security device 220 may assign a weight to one or more hash value parameters to calculate the score. In some implementations, the score may indicate a likelihood that a hash value is associated with a suspicious file (e.g., as compared to another hash value with a different score). Based on the score (e.g., whether the score satisfies a threshold value), client device 210 may determine whether to include the hash value in the second set of hash values.

Additionally, or alternatively, security device 220 may use fuzzy hashing to determine whether to include a hash value in the second set of hash values. For example, security device 220 may use fuzzy hashing to determine whether a hash value shares a degree of similarity with a hash value associated with a whitelist, to determine whether a hash value shares a degree of similarity with a hash value associated with a blacklist, to determine a quantity of client devices 210 associated with the hash value or similar hash values that share a degree of similarity with the hash value, or the like. In this way, files that are not identical, but that share a degree of similarity, can be identified for analysis (e.g., by including hash values associated with the files in the second set of hash values).

In some implementations, security device 220 may use metadata, associated with the set of files, to determine the second set of files to be analyzed (e.g., the hash values associated with the second set of files). As an example, security device 220 may determine to analyze a file based on a size of the file (e.g., may analyze files with a size that satisfies a threshold), based on a certificate associated with the file (e.g., if the file is not associated with a certificate, if the file is not associated with a certificate from a trusted authority, etc.), based on a timestamp associated with the file (e.g., a timestamp that satisfies a threshold, such as a timestamp after a particular time), or the like.

Additionally, or alternatively, security device 220 may compare metadata for multiple files to determine the second set of files to be analyzed (e.g., the hash values associated with the second set of files). As an example, security device 220 may determine that multiple files have a same or similar file name (e.g., within a threshold difference), but have sizes that differ by an amount that satisfies a threshold. In this case, security device 220 may determine to include the files in the second set of files.

As further shown in FIG. 4, process 400 may include prioritizing the second set of hash values to form a prioritized set of hash values corresponding to a prioritized set of files to be analyzed (block 430). For example, security device 220 may analyze the second set of hash values to form a prioritized set of hash values. The prioritized set of hash values may correspond to a prioritized set of files, stored by one or more client devices 210, to be analyzed. For example, the prioritized set of hash values may indicate an order in which corresponding files are to be analyzed (e.g., to determine whether the files are suspicious). Security device 220 may analyze (and/or provide for analysis) higher priority files, associated with higher priority hash values, before lower priority files associated with lower priority hash values.

In some implementations, security device 220 may prioritize hash values, included in the second set of hash values, based on a quantity of client devices 210 associated with the hash values. For example, security device 220 may assign a higher priority to a hash value associated with a larger quantity of client devices 210, and may assign a lower priority to a hash value associated with a smaller quantity of client devices 210. In this way, a file that impacts a larger quantity of client devices 210 may be analyzed before a file that impacts a smaller quantity of client devices 210. As another example, security device 220 may assign a lower priority to a hash value associated with a larger quantity of client devices 210, and may assign a higher priority to a hash value associated with a smaller quantity of client devices 210. In this way, a file that is more likely to be malware (e.g., because the file is only stored by a small quantity of client devices 210) may be analyzed before a file that is less likely to be malware.

Additionally, or alternatively, security device 220 may prioritize hash values, included in the second set of hash values, based on whether the hash values are associated with a blacklist. For example, security device 220 may assign a higher priority to a hash value associated with a blacklist, and may assign a lower priority to a hash value not associated with a blacklist. In this way, a file has been identified as suspicious (e.g., based on a blacklist) may be analyzed before a file that has not been identified as suspicious.

Additionally, or alternatively, security device 220 may prioritize hash values, included in the second set of hash values, based on whether the hash values are associated with a whitelist. For example, security device 220 may assign a lower priority to a hash value associated with a whitelist, and may assign a higher priority to a hash value not associated with a whitelist. In this way, a file has been identified as unsuspicious (e.g., based on a whitelist) may be analyzed after a file that has been identified as suspicious.

In some implementations, security device 220 may prioritize hash values, included in the second set of hash values, based on a client device identifier associated with the hash values. For example, security device 220 may assign a higher priority to a hash value associated with a suspicious client device identifier, and may assign a lower priority to a hash value not associated with a suspicious client device identifier. A suspicious client device identifier may refer to a client device identifier associated with a client device 210 that has been identified as suspicious (e.g., based on information stored by security device 220), that is associated with a suspicious user, that is associated with a suspicious hash value and/or a suspicious file (e.g., based on the client device 210 storing a suspicious file), or the like. In this way, files associated with a suspicious client device 210 may be analyzed before files that are not associated with a suspicious client device 210.

Additionally, or alternatively, security device 220 may prioritize hash values, included in the second set of hash values, based on a score associated with the hash values. For example, security device 220 may assign a higher priority to a hash value associated with a score that indicates a higher likelihood of being associated with a suspicious file, and may assign a lower priority to a hash value associated with a score that indicates a lower likelihood of being associated with a suspicious file. In this way, files that are more likely to be suspicious may be analyzed before files that are less likely to be suspicious.

In some implementations, security device 220 may prioritize the second set of hash values based on metadata, in a similar manner as described above with respect to determining whether to include a file in the second set of files based on the metadata.

As further shown in FIG. 4, process 400 may include requesting the prioritized set of files (block 440). For example, security device 220 may request the prioritized set of files from one or more client devices 210. In some implementations, security device 220 may request the files in order of priority (e.g., based on a relative priority level associated with different files). For example, security device 220 may send a first request for a first file associated with a high priority, before sending a second request for a second file associated with a low priority. Additionally, or alternatively, security device 220 may send a single request to a client device 210 that stores multiple files included in the prioritized set of files. In this case, security device 220 may indicate a priority order in which the client device 210 is to send the files to security device 220, and client device 210 may send the files in the priority order.

In some implementations, security device 220 may identify a client device 210 that stores a file included in the prioritized set of files. For example, security device 220 may determine a client device identifier that corresponds to a hash value of a file, and identify the client device 210 based on the client device identifier. In this case, security device 220 may request the file from the client device 210 identified by the client device identifier.

In some implementations, a hash value may be associated with a single client device identifier. In this case, security device 220 may request a file, corresponding to the hash value, from a single client device 210 identified by the client device identifier. In some implementations, a hash value may be associated with multiple client device identifiers. In this case, security device 220 may request a file, corresponding to the hash value, from all of the client devices 210 or from a subset of the client devices 210 (e.g., from fewer than all of the client devices 210, from a single client device 210, etc.). By requesting the file from a single client device 210, for example, security device 220 may reduce network traffic and may conserve network resources.

As further shown in FIG. 4, process 400 may include receiving the prioritized set of files (block 450), and causing the prioritized set of files to be analyzed (block 460). For example, security device 220 may receive the prioritized set of files from corresponding client devices 210 from which files, included in the prioritized set of files, were requested. In some implementations, security device 220 may analyze one or more files included in the prioritized set of files (e.g., based on a priority order, based on an order in which the files are received from client device(s) 210, etc.). Additionally, or alternatively, security device 220 may provide one or more files, included in the prioritized set of files, to another device for analysis (e.g., based on a priority order, based on an order in which the files are received from client device(s) 210, etc.). A file may be analyzed by comparing the file to a list of files known to satisfy a characteristic (e.g., known to suspicious, known to be malware, etc.), by monitoring the file for suspicious activity (e.g., sending information to or receiving information from a known command and control server, etc.), or the like.

Security device 220 may cause the prioritized set of files to be analyzed to determine whether one or more files, included in the prioritized set, are suspicious. A suspicious file may include, for example, a file that violates a policy associated with network 230, a file that is harmful to network 230 (e.g., a file that is malicious, such as malware, ransomware, etc.), or a file that may otherwise be of interest to a network administrator (e.g., because the file is stored by a large quantity of client devices 210 in network 230, because the file is similar to a blacklisted file, etc.).

In some implementations, security device 220 may receive an indication of whether a file is suspicious (e.g., based on analyzing the file or providing the file for analysis). If a file is determined to be suspicious, security device 220 may perform a corrective action in association with the file. For example, security device 220 may transmit a message (e.g., to a device associated with a network administrator, to an email address associated with the network administrator, etc.) that identifies the suspicious file and/or client devices 210 that store the suspicious file. As another example, security device 220 may transmit an instruction to client devices 210 that store the suspicious file (e.g., an instruction to delete the suspicious file, an instruction to monitor the suspicious file, an instruction to quarantine the suspicious file, an instruction to power down, an instruction to disable a connection to network 230, etc.). As another example, security device 220 may disconnect client devices 210, that store the suspicious file, from network 230.

In this way, security device 220 may detect and/or identify suspicious files stored by client device(s) 210 on network 230 with little or no prior information that indicates whether a file is suspicious. Furthermore, techniques described herein may assist security device 220 from avoiding detection by an application associated with a suspicious file, which may otherwise be able to take a preventative measure to avoid detection.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of detecting suspicious files resident on a network.

Figure 5A:
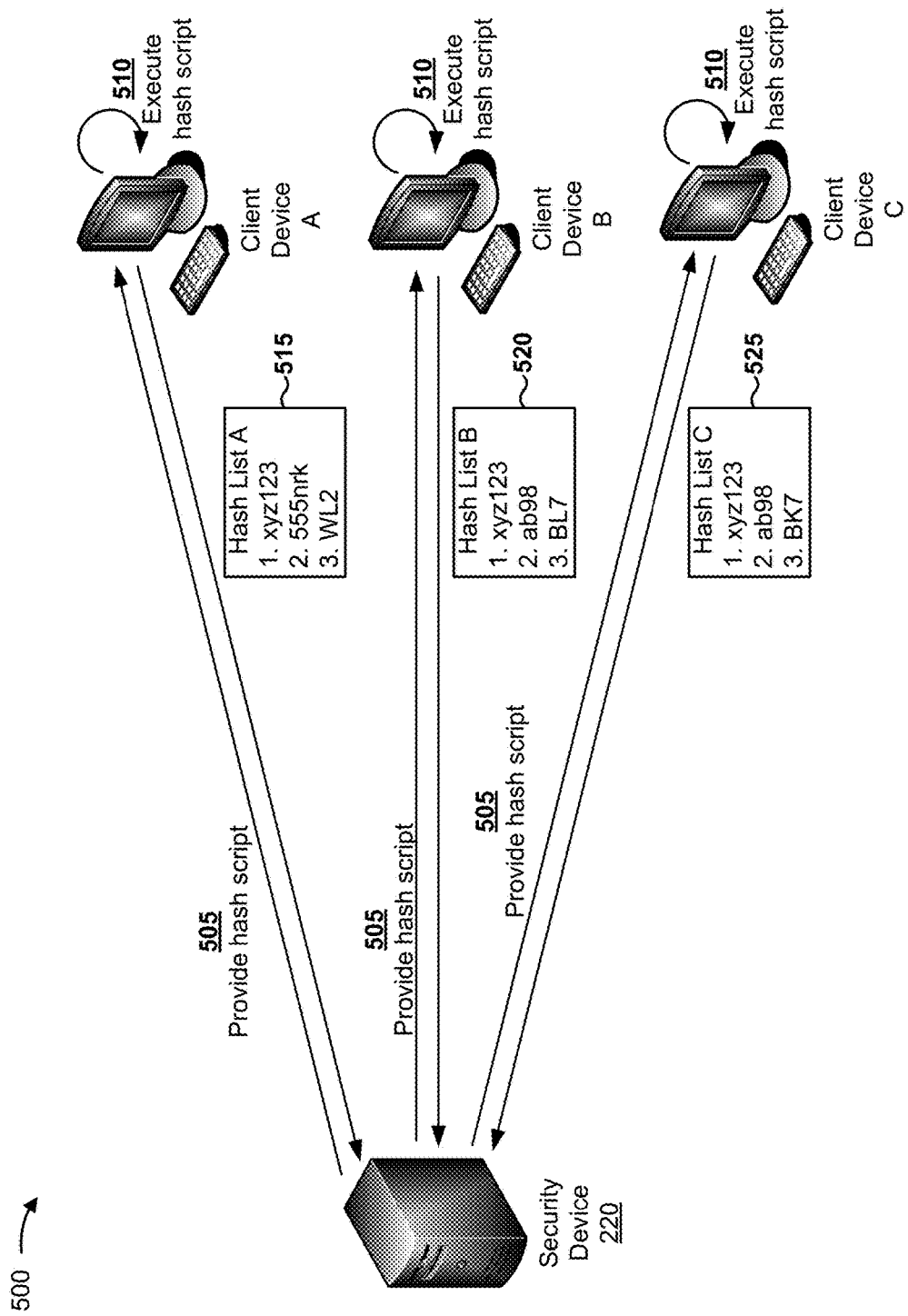
FIGS. 5A-5E are diagrams of an example implementation relating to the example process shown in FIG. 4.

As shown in FIG. 5A, and by reference number 505, assume that security device 220 provides a hash script to client devices 210 in network 230, shown as Client Device A, Client Device B, and Client Device C. As shown by reference number 510, assume that client devices 210 execute the hash script, which causes a hash function to be applied to files, stored by client devices 210, to generate hash values. As shown by reference number 515, assume that Client Device A provides hash values, shown as Hash List A, to security device 220. The hash values in Hash List A include hash values of "xyz123," "555nrk," and "WL2." As shown by reference number 520, assume that Client Device B provides hash values, shown as Hash List B, to security device 220. The hash values in Hash List B include hash values of "xyz123," "ab98," and "BL7." As shown by reference number 525, assume that Client Device C provides hash values, shown as Hash List C, to security device 220. The hash values in Hash List C include hash values of "xyz123," "ab98," and "BK7." The quantity of client devices 210 and hash values shown in implementation 500 are provided as an example and for simplicity. In practice, there may be a different quantity of client devices 210 and/or hash values.

Figure 5B:
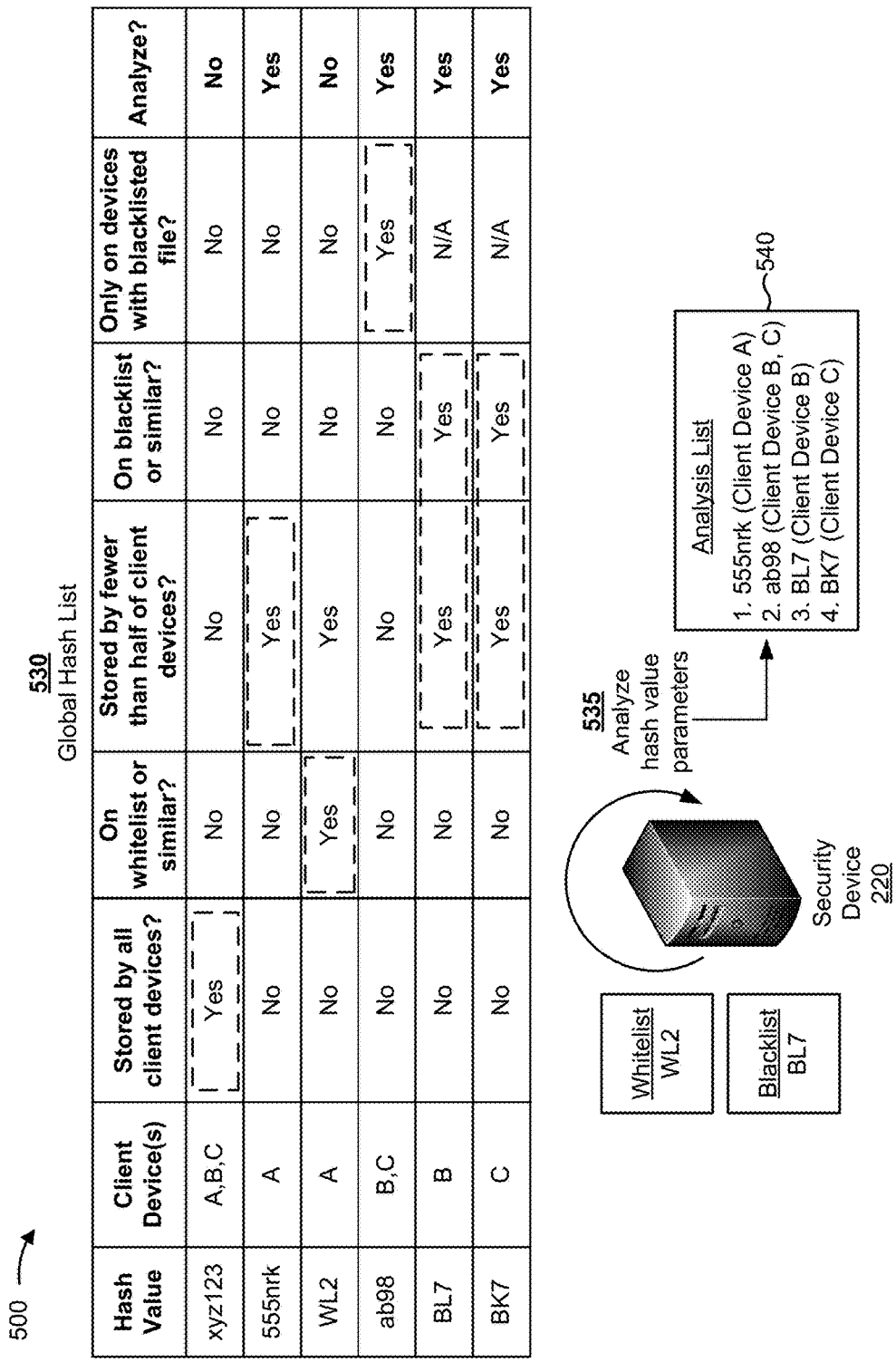

As shown in FIG. 5B, assume that security device 220 combines the hash values received from Client Device A, Client Device B, and Client Device C (e.g., the hash values included in Hash List A, Hash List B, and Hash List C) to form a first set of hash values, shown by reference number 530 as "Global Hash List." As shown by reference number 535, assume that security device 220 analyzes hash value parameters, associated with the hash values, to form a second set of hash values, shown as "Analysis List."

As an example, and as shown, assume that security device 220 determines not to add the hash value of "xyz123" to the Analysis List because this hash value is stored by all client devices 210 (e.g., and thus may be more likely to be a system file, a required file, or another type of unsuspicious file than a suspicious file). As another example, and as shown, assume that security device 220 determines to add the hash value of "555nrk" to the Analysis List because this hash value is stored by fewer than half of the client devices 210 (e.g., and thus may be more likely to be a suspicious file than a system file, a required file, or another type of unsuspicious file).

As another example, and as shown, assume that security device 220 determines not to add the hash value of "WL2" to the Analysis List because this hash value is included in a whitelist (e.g., and thus has been previously identified as unsuspicious). As another example, and as shown, assume that security device 220 determines to add the hash value of "ab98" to the Analysis List because this hash value is only stored by client devices 210 that also store blacklisted files, such as files associated with the hash values "BL7" and "BK7" (e.g., and thus are more likely to be suspicious).

As another example, and as shown, assume that security device 220 determines to add the hash value of "BL7" to the Analysis List because this hash value is included in a blacklist (e.g., and thus has been previously identified as suspicious). As another example, and as shown, assume that security device 220 determines to add the hash value of "BK7" to the Analysis List because this hash value shares a degree of similarity with the hash value "BL7," which is included in a blacklist (e.g., and thus has been previously identified as suspicious).

As shown by reference number 540, based on analyzing the hash values in the Global Hash List, security device 220 generates the Analysis List. As shown, the Analysis List includes the hash value "555nrk" (e.g., received from Client Device A), the hash value "ab98" (e.g., received from Client Device B and Client Device C), the hash value "BL7" (e.g., received from Client Device B), and the hash value "BK7" (e.g., received from Client Device C).

Figure 5C:
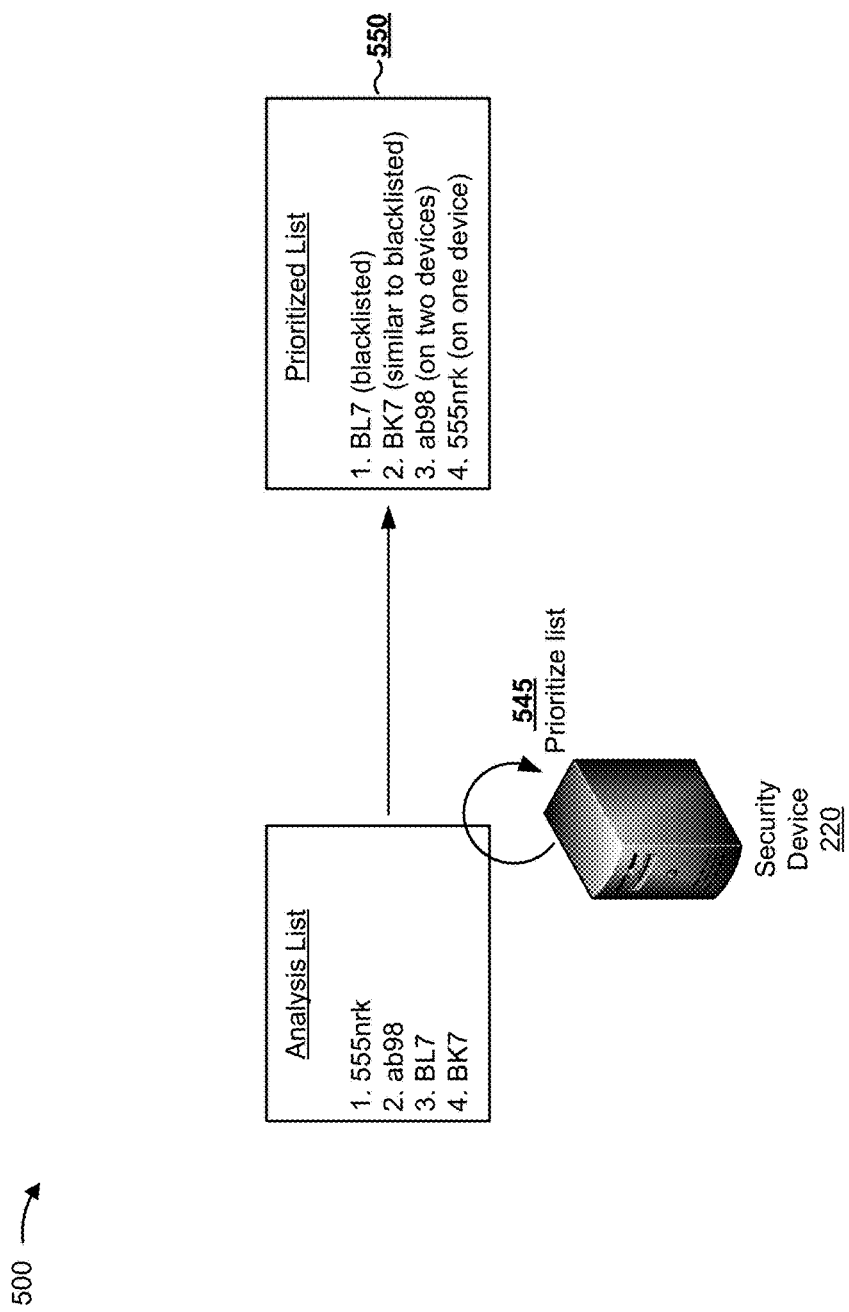

As shown in FIG. 5C, and by reference number 545, assume that security device 220 analyzes the hash values included in the Analysis List (e.g., the second set of hash values) to generate a Prioritized List of hash values. As shown by reference number 550, assume that the Prioritized List prioritizes the hash values in the following priority order: "BL7" (e.g., which is included in the blacklist), "BK7" (e.g., which shares a degree of similarity with "BL7," which is included in the blacklist), "ab98" (e.g., which is associated with a file stored by two client devices 210), and "555nrk" (e.g., which is associated with a file stored by one client device 210).

Figure 5D:
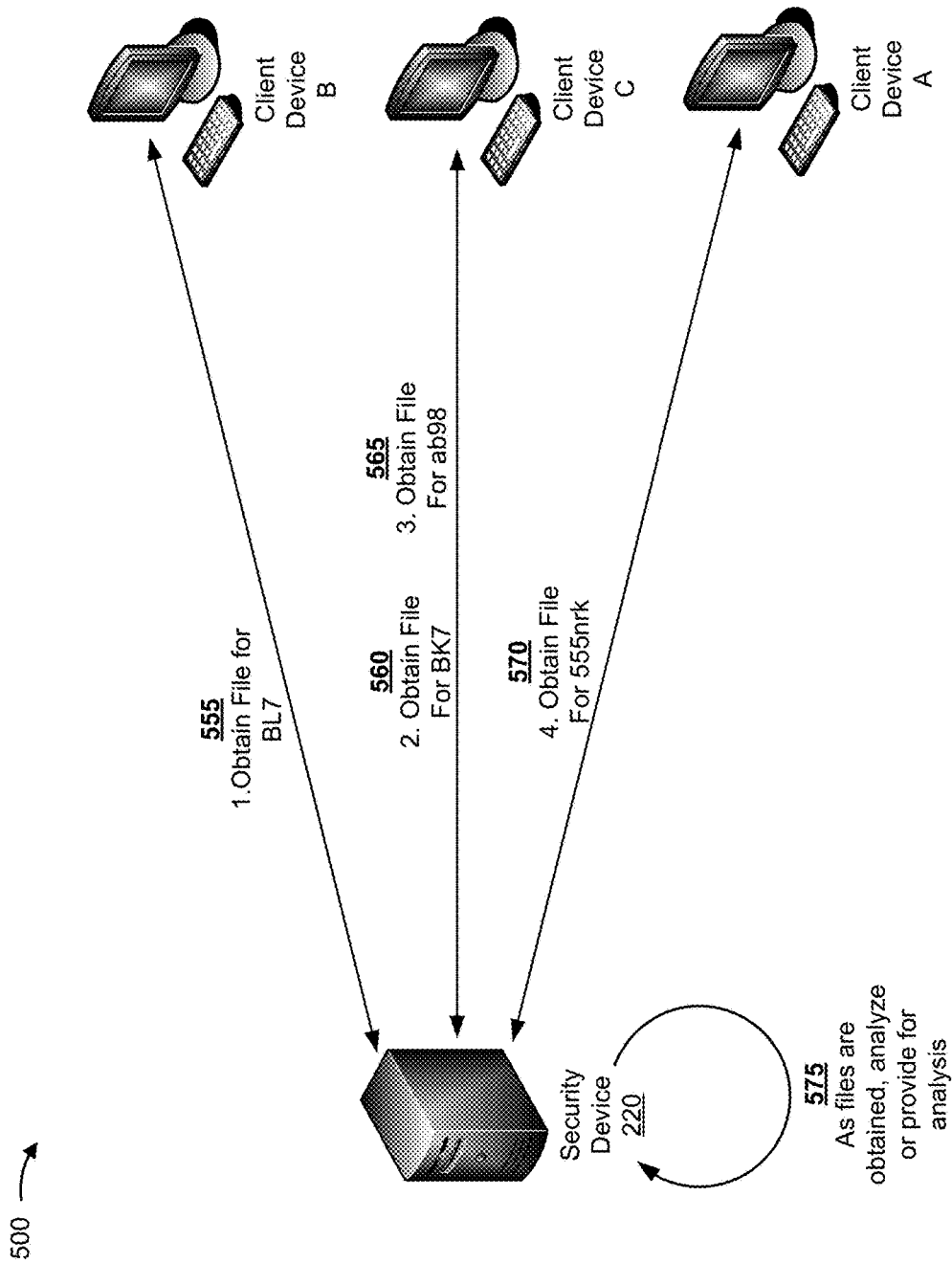

As shown in FIG. 5D, and by reference number 555, based on the priority order, security device 220 first requests and obtains the file associated with "BL7" from Client Device B. As shown by reference number 560, based on the priority order, security device 220 next requests and obtains the file associated with "BK7" from Client Device C. As shown by reference number 565, based on the priority order, security device 220 next requests and obtains the file associated with "ab98" from Client Device C. As shown by reference number 570, based on the priority order, security device 220 next requests and obtains the file associated with "555nrk" from Client Device A. As shown by reference number 575, assume that security device 220 analyzes the files or provides the files for analysis as the files are obtained.

Figure 5E:
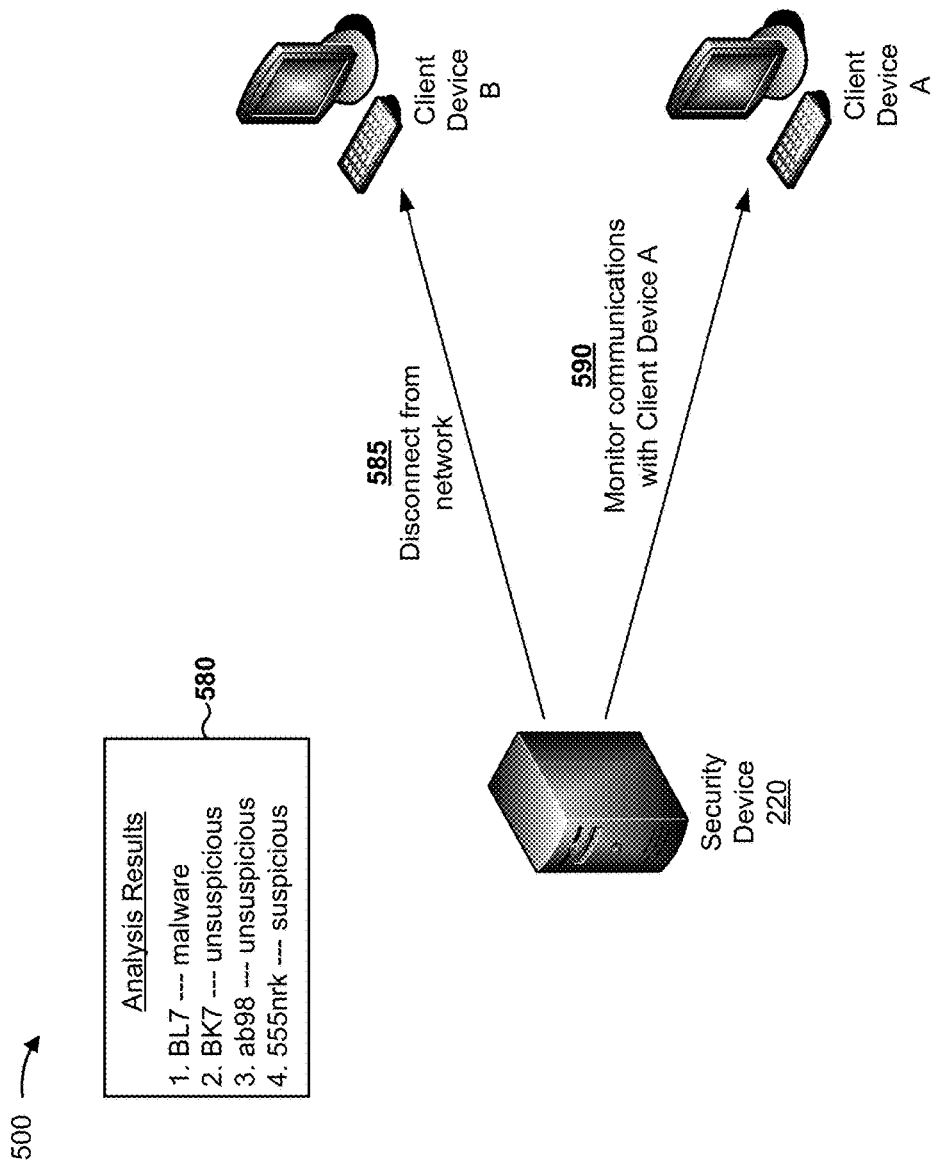

As shown in FIG. 5E, and by reference number 580, based on the analysis, assume that security device 220 determines that the file associated with the hash value of "BL7" is malware, determines that the file associated with the hash value of "BK7" is unsuspicious, determines that the file associated with the hash value of "ab98" is unsuspicious, and determines that the file associated with the hash value of "555nrk" is suspicious. Based on these determinations, and as shown by reference number 585, assume that security device 220 disconnects Client Device B from the network (e.g., because "BL7" is associated with a file determined to be malware). Further, as shown by reference number 590, assume that security device 220 monitors communications with Client Device A (e.g., because "555nrk" is associated with a file determined to be suspicious). In this way, security device 220 may detect and identify suspicious files resident on a network with little or no prior information that indicates whether a file is suspicious.

As indicated above, FIGS. 5A-5E are provided merely as an example. Other examples are possible and may differ from what was described with regard to FIGS. 5A-5E.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      determine a first set of hash values corresponding to a first set of files stored by a plurality of client devices;
      analyze information associated with the first set of hash values to determine a second set of hash values corresponding to a second set of files to be analyzed, the second set of hash values being different from the first set of hash values;
      for respective hash values of the second set of hash values, determine a quantity of client devices, of the plurality of client devices, that store a respective file associated with a respective hash value of the second set of hash values;
      for the respective hash values of the second set of hash values, determine a client device identifier for a client device, of the plurality of client devices, that stores the respective file associated with the respective hash value of the second set of hash values;
      prioritize the second set of hash values to form a prioritized set of hash values corresponding to a prioritized set of files, of the second set of files, to be analyzed,
         the prioritized set of hash values indicating a prioritized order of the second set of hash values that are ordered based on:
            the quantity of client devices that store the respective file, associated with the respective hash value, for the respective hash values of the second set of hash values, and
            the client device identifier for the client device that stores the respective file associated with the respective hash value, for the respective hash values of the second set of hash values;
      send at least one request for the prioritized set of files to one or more client devices of the plurality of client devices based on the prioritized order,
         the at least one request including a request for multiple files, of the prioritized set of files, from a single client device of the one or more client devices, and
         the at least one request indicating an order, based on the prioritized order, in which the single client device is to send the multiple files;
      receive the prioritized set of files; and
      cause the prioritized set of files to be analyzed in the prioritized order.

2. The device of claim 1, where
   a hash value, of the first set of hash values, is included in the second set of hash values when a quantity of client devices that store a file associated with the hash value satisfies a threshold, and
   the hash value, of the first set of hash values, not being included in the second set of hash values when the quantity of client devices that store the file associated with the hash value does not satisfy the threshold.

3. The device of claim 2, where the threshold is based on a total number of client devices included in the plurality of client devices.

4. The device of claim 1, where the one or more processors, when analyzing the information associated with the first set of hash values to determine the second set of hash values, are to:
 determine whether a hash value, of the first set of hash values, is associated with a whitelist that indicates that the hash value is associated with an unsuspicious file; and
 selectively include the hash value in the second set of hash values based on determining whether the hash value is associated with the whitelist,
  the hash value being included in the second set of hash values when the hash value is not associated with the whitelist, and
  the hash value not being included in the second set of hash values when the hash value is associated with the whitelist.

5. The device of claim 1, where the one or more processors, when analyzing the information associated with the first set of hash values to determine the second set of hash values, are to:
 determine whether a hash value, of the first set of hash values, is associated with a blacklist that indicates that the hash value is associated with a suspicious file; and
 selectively include the hash value in the second set of hash values based determining whether the hash value is associated with the blacklist,
  the hash value being included in the second set of hash values when the hash value is associated with the blacklist, and
  the hash value not being included in the second set of hash values when the hash value is not associated with the blacklist.

6. The device of claim 1, where the one or more processors, when analyzing the information associated with the first set of hash values to determine the second set of hash values, are to:
 determine a client device identifier of a client device, of the plurality of client devices, associated with a hash value of the first set of hash values; and
 selectively include the hash value in the second set of hash values based on the client device identifier of the client device associated with the hash value of the first set of hash values.

7. The device of claim 1, where the one or more processors, when analyzing the information associated with the first set of hash values to determine the second set of hash values, are to:
 calculate a score associated with a hash value, of the first set of hash values, based on a plurality of hash value parameters associated with the hash value; and
 selectively include the hash value in the second set of hash values based on the score,
  the hash value being included in the second set of hash values when the score satisfies a threshold, and
  the hash value not being included in the second set of hash values when the score does not satisfy the threshold.

8. The device of claim 1, where the one or more processors, when prioritizing the second set of hash values, are to:
 assign a higher priority to a first hash value, of the second set of hash values, than a second hash value, of the second set of hash values, based on the first hash value being associated with a respective file stored by a larger quantity of client devices than the second hash value; and
 where the one or more processors, when causing the prioritized set of files to be analyzed in the prioritized order, are to:
 cause a first file, associated with the first hash value, to be analyzed before a second file, associated with the second hash value, based on the first hash value being assigned a higher priority than the second hash value.

9. A non-transitory computer-readable medium storing instructions, the instructions comprising:
 one or more instructions that, when executed by one or more processors, cause the one or more processors to:
  determine a first set of hash values corresponding to a first set of files stored by at least one client device of a plurality of client devices;
  analyze one or more hash value parameters associated with the first set of hash values to determine a second set of hash values corresponding to a second set of files to be analyzed;
  for respective hash values of the second set of hash values, determine a quantity of client devices, of the plurality of client devices, that store a respective file associated with a respective hash value of the second set of hash values;
  for the respective hash values of the second set of hash values, determine a client device identifier for a client device, of the plurality of client devices, that stores the respective file associated with the respective hash value of the second set of hash values;
  prioritize the second set of hash values to form a prioritized set of hash values corresponding to a prioritized set of files, of the second set of files, to be analyzed,
   the prioritized set of hash values indicating a prioritized order of the second set of hash values that are ordered based on:
    the quantity of client devices that store the respective file, associated with the respective hash value, for the respective hash values of the second set of hash values, and
    the client device identifier for the client device that stores the respective file associated with the respective hash value, for the respective hash values of the second set of hash values;
  send at least one request for the prioritized set of files to the at least one client device based on the prioritized order,
   the at least one request including a request for multiple files, of the prioritized set of files, from a single client device of the at least one client device,
   the at least one request indicating an order, based on the prioritized order, in which the single client device is to send the multiple files;
  receive the prioritized set of files; and
  identify one or more suspicious files, included in the prioritized set of files, based on an analysis of the prioritized set of files in the prioritized order.

10. The non-transitory computer-readable medium of claim 9, where the one or more instructions, when executed by the one or more processors, further cause the one or more processors to:
 determine the second set of files based on metadata associated with the first set of files, where the metadata includes at least one of:

a size of a file, of the first set of files,
a certificate associated with the file, or
a timestamp associated with the file.

11. The non-transitory computer-readable medium of claim 9, where the one or more instructions, that cause the one or more processors to prioritize the second set of hash values, cause the one or more processors to:
determine whether the respective hash value, of the second set of hash values, is associated with a whitelist that indicates that the respective hash value is associated with an unsuspicious file; and
prioritize the respective hash value within the second set of hash values based on determining whether the respective hash value is associated with the whitelist.

12. The non-transitory computer-readable medium of claim 9, where the one or more instructions, that cause the one or more processors to prioritize the second set of hash values, cause the one or more processors to:
determine whether the respective hash value, of the second set of hash values, is associated with a blacklist that indicates that the respective hash value is associated with a suspicious file; and
prioritize the respective hash value within the second set of hash values based on determining whether the respective hash value is associated with the blacklist.

13. The non-transitory computer-readable medium of claim 9, where the one or more instructions, that cause the one or more processors to prioritize the second set of hash values, cause the one or more processors to:
calculate, based on the one or more hash value parameters, a score associated with the respective hash value of the second set of hash values; and
prioritize the respective hash value within the second set of hash values based on the score associated with the respective hash value.

14. The non-transitory computer-readable medium of claim 9, where the one or more instructions, that cause the one or more processors to identify the one or more suspicious files based on an analysis of the prioritized set of files, cause the one or more processors to:
perform the analysis of the prioritized set of files to identify the one or more suspicious files; or
provide the prioritized set of files to a device for performing the analysis to identify the one or more suspicious files.

15. A method, comprising:
determining, by a device, a first set of hash values corresponding to a first set of files stored by at least one client device of a plurality of client devices;
analyzing, by the device, one or more hash value parameters associated with the first set of hash values to determine a second set of hash values corresponding to a subset of the first set of files to be analyzed,
the second set of hash values being a subset of the first set of hash values;
for respective hash values of the second set of hash values, determining, by the device, a quantity of client devices, of the plurality of client devices, that store a respective file associated with a respective hash value of the second set of hash values,
for the respective hash values of the second set of hash values, determine a client device identifier for a client device, of the plurality of client devices, that stores the respective file associated with the respective hash value of the second set of hash values;
prioritizing, by the device, the second set of hash values to form a prioritized set of hash values corresponding to a prioritized set of files, of the subset of the first set of files, to be analyzed,
the prioritized set of hash values indicating a prioritized order of the second set of hash values that are ordered based on:
the quantity of client devices that store the respective file, associated with the respective hash value, for the respective hash values of the second set of hash values, and
the client device identifier for the client device that stores the respective file associated with the respective hash value, for the respective hash values of the second set of hash values;
sending, by the device, a request for the prioritized set of files to the at least one client device based on the prioritized order,
the request including a request for multiple files, of the prioritized set of files, from a single client device of the at least one client device, and
the request indicating an order, based on the prioritized order, in which the single client device is to send the multiple files;
receiving, by the device, the prioritized set of files; and
identifying, by the device, one or more suspicious files, included in the prioritized set of files, based on an analysis of the prioritized set of files in the prioritized order.

16. The method of claim 15, further comprising:
sending a request for a hash value, of the first set of hash values, from a client device of the plurality of client devices,
the request causing the client device to generate the hash value by applying a hash function to a file, of the first set of files, stored by the client device; and
receiving the hash value from the client device.

17. The method of claim 15, where determining the first set of hash values comprises:
executing a hash function on a file, of the first set of files, to generate a hash value of the first set of hash values.

18. The method of claim 15, where the plurality of client devices are resident on a same network.

19. The method of claim 15, where analyzing the one or more hash value parameters associated with the first set of hash values to determine the second set of hash values comprises:
analyzing at least one of:
a quantity of client devices associated with a hash value of the first set of hash values;
a whitelist that stores information indicating whether the hash value associated with an unsuspicious file;
a blacklist that stores information indicating whether the hash value is associated with a suspicious file;
a client device identifier associated with the hash value; or
a score, calculated based on the one or more hash value parameters, associated with the hash value.

20. The method of claim 15, where prioritizing the second set of hash values to form the prioritized set of hash values comprises:
prioritizing the second set of hash values based on at least one of:
a whitelist that stores information indicating whether the respective hash value is associated with an unsuspicious file;

a blacklist that stores information indicating whether the respective hash value is associated with a suspicious file;
a client device identifier associated with the respective hash value; or
a score, calculated based on the one or more hash value parameters, associated with the respective hash value.

* * * * *